J. SLADE.
Assignor to the INTERNATIONAL GAS LIGHT CO.
Modes of Preventing Loss of Heat in Charging Gas Retorts.
No. 8,422. Reissued Sept. 17, 1878.
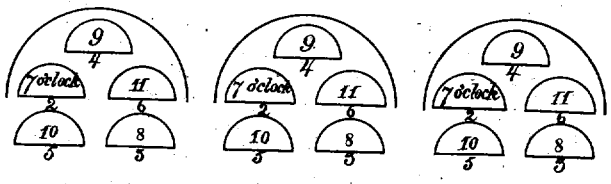
Witnesses:
M. Morgan
D. P. Cowl
James Slade
Inventor:
by M. Bailey
his attorney

UNITED STATES PATENT OFFICE.

JAMES SLADE, OF YONKERS, N. Y., ASSIGNOR, BY MESNE ASSIGNMENTS, TO THE INTERNATIONAL GAS LIGHT COMPANY, OF NEW YORK CITY.

IMPROVEMENT IN MODES OF PREVENTING LOSS OF HEAT IN CHARGING GAS-RETORTS.

Specification forming part of Letters Patent No. 206,144, dated July 16, 1878; Reissue No. 8,422, dated September 17, 1878; application filed September 13, 1878.

*To all whom it may concern:*

Be it known that I, JAMES SLADE, of Yonkers, Westchester county, New York, have invented certain new and useful Improvements in the Manufacture of Illuminating-Gas from Coal, of which the following is a specification:

By the usual method of manufacturing illuminating or coal gas, the retorts are set three, five, or more in one bench, all heated by one fire, and are usually charged all, or nearly all, at one time, thus reducing the temperature to such a degree at the most important time, when the coal is throwing off gas the fastest, that the gas is not permanent, but most of it is condensed to tar and water in the hydraulic main or condensers, owing to its being generated at too low a temperature.

Now, my object is to prevent loss of heat at this time in using the ordinary bench or benches of retorts; and this I effect by charging only one or two retorts at a time, (preferably the former,) selecting for the purpose such retort or retorts as are at a distance as far as possible from those last charged, so that the retorts that have had time to regain their heat will act as heat-reservoirs, and impart or give off their surplus heat to the new charge, thus preventing, in the newly-charged retort or retorts, that excessive lowering of temperature to which, under the method of charging hitherto employed, they have been subjected at the time they are doing the most work.

I also charge the coal well back in the retorts, so that, say, the first foot from the mouth-piece may be left free from coal and act as a catch-all for the tar or tarry vapor before it can reach the stand-pipe, in which way I am enabled to redistill from the same what light oils or naphtha may have escaped from the body of the retort.

In carrying out my invention, suppose there are three benches, of five retorts each, in use, as indicated in the accompanying diagram. Each retort I charge at stated intervals—say of five hours. Thus I charged those marked 7 o'clock at that hour, these having previously been charged at 2 o'clock, as indicated by the figure 2 under the retorts, and so on to 8, 9, 10, and 11. The figure beneath each retort indicates the hour at which that retort was previously last charged. I then charge the 7 o'clock one again at 12 o'clock, 8 at 1, 9 at 2, and so on with any number of benches, whether one or one hundred.

Taking the 11 o'clock charge, it will be seen that it will be supported by those that were charged at 8 and 9, the 10 o'clock charge by those that were charged at 7 and 8, the 9 o'clock charge by the one charged at 7 and the one to be charged at 11, (the latter having been charged previously at 6,) the 8 o'clock charge by those marked 10 and 11, they having been charged previously at 5 and 6 o'clock, respectively, and the 7 o'clock by those marked 9 and 10, they having been charged at 4 and 5 o'clock, respectively. Thus the temperature cannot possibly fall as it does when the retorts are charged by the usual method.

In this way, instead of producing at times vapors that will condense, I obtain a product which is a rich and permanent illuminating-gas. I also avoid much contraction and expansion of the retorts, and so render them serviceable for a longer time.

By the ordinary method of charging, one ton of coal will produce on an average ten thousand cubic feet of gas, of from fourteen to fifteen candle power, when made without cannel-coal or other enriching material.

By my invention, under the same conditions, the yield of one ton of coal is on an average twelve thousand three hundred cubic feet of gas, of from sixteen to seventeen candle power; and this I accomplish without requiring any change or alteration or reorganization of existing apparatus now in use for making coal-gas.

Having described my improvements, what I claim, and desire to secure by Letters Patent, is—

In the manufacture of illuminating-gas, using the ordinary bench of retorts, the mode of preventing loss of heat at the time when the coal is throwing off gas the fastest, which consists in charging the retorts in each bench successively at stated intervals, the retort undergoing the operation of charging being the one farthest removed from the retort or retorts last charged.

In testimony that I claim the foregoing I have hereunto set my hand this 11th day of September, 1878.

JAS. SLADE.

Witnesses:

ANTONIO C. GONZALEZ,

JOHN J. FINNEGAN.